United States Patent [19]

Andreen

[11] Patent Number: 4,986,555

[45] Date of Patent: Jan. 22, 1991

[54] CARRIAGE FOR HANDLING LAUNDRY

[75] Inventor: Gunnar B. Andreen, Lund, Sweden

[73] Assignee: Aktiebolaget Electrolux, Stockholm, Sweden

[21] Appl. No.: 160,513

[22] Filed: Feb. 26, 1988

[30] Foreign Application Priority Data

Mar. 4, 1987 [SE] Sweden ............................ 8700904

[51] Int. Cl.$^5$ ............................................. B62B 3/02
[52] U.S. Cl. ................................. 280/47.35; 280/79.3
[58] Field of Search .......... 280/47.34, 47.35, 47.37 R, 280/79.1 R, 79.1 A, 79.3

[56] References Cited

U.S. PATENT DOCUMENTS

| | | | |
|---|---|---|---|
| 2,137,626 | 4/1944 | Adams | 280/47.35 |
| 4,615,088 | 8/1979 | Nelson | 280/47.35 |

FOREIGN PATENT DOCUMENTS

| | | |
|---|---|---|
| 8704682 | 3/1987 | Fed. Rep. of Germany . |
| 1015877 | 3/1950 | France . |
| 2044186 | 10/1980 | United Kingdom ........... 280/79.1 R |

Primary Examiner—Charles A. Marmor
Assistant Examiner—Richard Camby
Attorney, Agent, or Firm—Pearne, Gordon, McCoy & Granger

[57] ABSTRACT

This invention relates to carriage for handling laundry which is used at hotels, hospitals or like the carriage comprising a chassis being provided with one or several shelves on which clean articles are transported and delivered from a laundry. The carriage (10) is shaped so that it can be used as a cleaning carriage by applying one or several releasable sections (11,12) to the carriage the section or sections being intended to support the remaining articles which are necessary to accomplish the cleaning work.

4 Claims, 1 Drawing Sheet

CARRIAGE FOR HANDLING LAUNDRY

This invention relates to a carriage for handling laundry which is used at hotels, hospitals or the like, the carriage comprising a wheel supported chassis being provided with one or several shelves on which clean articles are transported and delivered from the laundry.

Such carriages are previously known and are called roll-cages. These roll-cages are transported into a storing room at the hotel or the hospital and the cleaning staff picks the linen which is to be used during the cleaning round and deposits the linen on a special cleaning carriage which is moved to the different rooms for cleaning the rooms and for exchanging towels and linen. Also a garbage sack, soaps, cleaning agents and the like are carried on the carriage, these articles beeing stored in particular containers and storage compartments on the cleaning carriage. The carriage also supports a sack in which the dirty laundry is deposited.

Thus, the drawback when handling laundry with the known roll-cages is that the handling is time-consuming since it is necessary to reload the linen from the roll-cage to the cleaning carriage.

The purpose of this invention is to eliminate this reload procedure thereby creating a more flexible handling system for the laundry. Another purpose is to save space by eliminating the need for a special cleaning carriage.

One embodiment of the invention will now be described with reference to the accompanying drawings in which FIG. 1 is a perspective view of a carriage according to the invention with associated sections.

Figure 1:
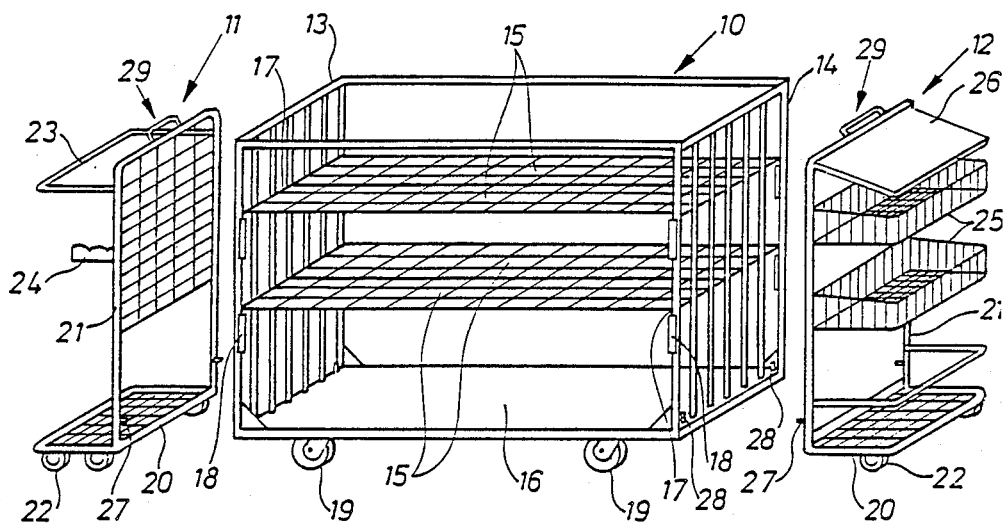
Figure 5:
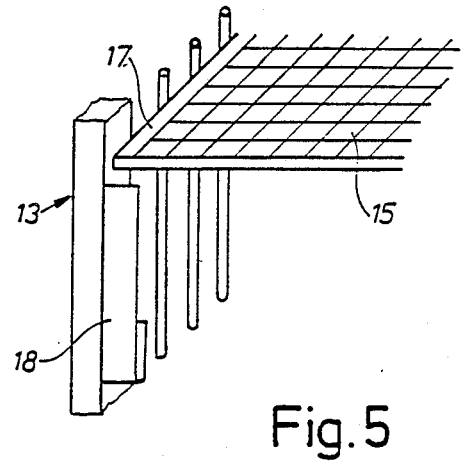

As appears from FIG. 1 the carriage comprises a middle section in the form of a carriage 10 and two releasable lateral sections 11 and 12, the carriage and sections assembled forming a complete cleaning carriage. The carriage 10 comprises a box-like pipe frame with sidewalls 13 and 14. These sidewalls are formed by threads which are drawn between the pipes in the frame. Between the sidewalls there are several thread shelves 15 as well as a bottom 16. The threadshelves 15 are releasably supported on a U-shaped profile 17 which is secured to the sidewall 13 and 14 and each shelf is formed out of two such shelves 15 which are placed beside each other. Thus these shelves can be taken away from the carriage and then be placed vertically in holders 18 on the pipe frame in order to form walls of the carriage. These holders for instance comprise a sheet metal which is bent in a way as shown in FIG. 5. The purpose of this arrangement will appear from the following.

The carriage is supported at the corners by pivot wheels 19.

The sections 11 and 12 both comprise a tube frame with a lower horizontal part 20 and an upwards extending vertical part 21, the horizontal part being provided with several wheels 22. The two sections however differ from each other since one section 11 has a bag holder 23 for a garbage sack and for a laundry sack and a tool support 24 for different types of working tools, such as mops, brushes or the like whereas the section 12 support several thread baskets 24 for storing different types articles of consumption for instance soaps, schampoo, cleaning agents and so on. The illustrated section 12 at its upper part also has a flat shelf 26 on which notebooks can be placed.

Figure 2:
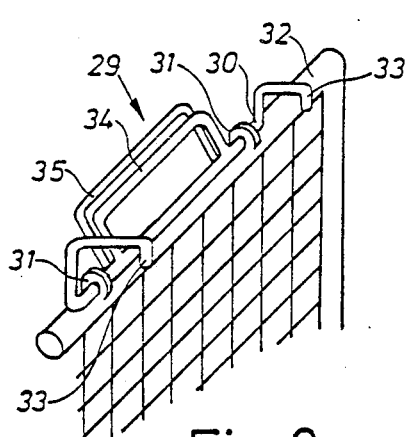
FIGS. 2 and 3 are perspective views of the locking means connecting the carriage with the sections in an open and in a closed position.
Figure 3:
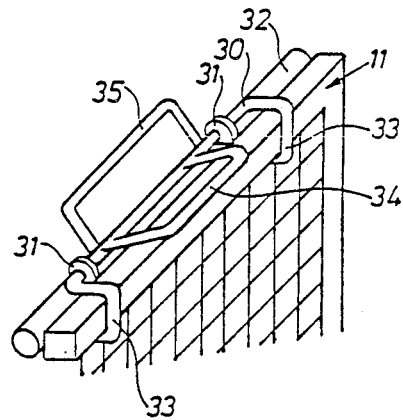
Figure 4:
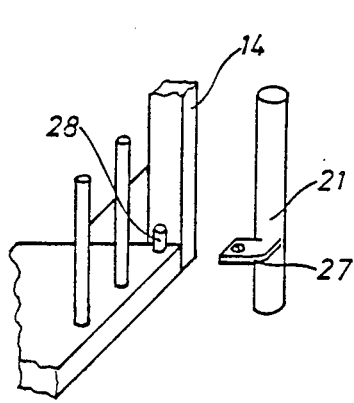
FIG. 4 is a perspective view showing the connecting means between the sections and the cleaning carriage and FIG. 5 is a perspective view showing a detail of the carriage.

The sections 11 and 12, as well as the carriage 10, have cooperating fastening means being in the form of lugs 27 with holes which are attached to the sections, and shafts 28 attached to the carriage by means of which lower part of the sections can be moved to engage the side wall of the carriage 10. Moreover at the upper part of the sections 11 and 12 there is a locking means 29 which is shown in detail in FIGS. 2 and 3.

The locking means 29 comprises a yoke formed by means of a bent bar 30 which is turnably fastened by two lugs 31 at the upper horizontal part 32 of the pipe frame of the section. The ends of the bar 30 are formed as hooks 33 whereas the central part of the bar has a handle 34 by means of which the bar can be turned or rotated. Moreover, there is a further handle 35 which is fastened to the horizontal part 32 of the tube frame of the section in order to move the pipe section.

The device is used in the following way. Clean linen is transported from the laundry on the carriage 10 and is protected by a releasable cover (not shown). When the carriage arrives to a place where the linen is to be used the sections 11 and 12 are connected to the side walls of the carriage by inclining the section so that the holes of the lugs 27 engage the shafts 28 of the carriage. Then the section is raised and the handle 34 is moved inwards towards the carriage. This results in that the wheels 22 are lifted from the floor and the hooks 33 engage the horizontal part of the pipe frame on the walls 13 and 14 respectively of the carriage 10, the sections being locked to the carriage. The carriage is now ready to be used as a cleaning carriage.

When the lines on the carriage have been emptied the shelves 15 are pulled out and placed vertically in the holders 18 whereby an upwardly open carriage is created. In this carriage the sack with laundry is placed and the two sections are released and the carriage is returned to the laundry. In the same way a new carriage can be prepared for the continued work.

By using the carriage described above the handling of clean linen and laundry is considerably facilitated at the same time as the need for conventional cleaning carriages is eliminated.

It is of course obvious that any kind of suitable locking means could be used to fix the sections to the carriage. For instance, the sections could at there lower part be provided with a central fork-like element for engaging the lower horizontal part of the tube frame. The upper part of the side wall of the carriage could be provided with a hook-like element which is turnable about a horizontal axis and when acted on by the section is lifted automatically. When the section has reached its vertical position the upper part of the pipe frame of the section enters a support on the carriage and the hook falls down behind the pipe thereby locking the section to the carriage.

What is claimed:

1. A multi-purpose wheeled cart for use in hotels, hospitals and the like comprising a box-like structure for transporting clean linen and having vertical end walls, a detachable section, means provided for attaching said section to one of said end walls, said detachable section being adapted to transport cleaning tools and materials whereby after the clean linen has been removed from said cart the latter is available to accommodate dirty linen for transport to the laundry, said cart and section being provided with coupling means at the lower part of said cart, and a latching means at the upper part of said section for removably attaching said section to said cart, said latching means including a yoke attached to said section or cart, said yoke having a handle capable of being rotated so that it engages said cart on the section to thereby lock the section to said cart.

2. A combination laundry and cleaning wheeled cart for use in hotels, hospitals and the like comprising a box-like structure having opposite vertical end walls, at least one removable shelf for holding clean linen being supported at opposite ends by said end walls, at least one detachable section, means mounting said detachable section on one of said opposite vertical end walls, said mounting means having attaching means at the lower part of said cart and said section engageable by lifting said detachable section relative to said cart, said means including a rotatable latching member for locking said section to said box-like structure at the upper part of said cart and said section, said latching member having a handle for rotating it so that it engages said cart on the section to thereby lock the section to said cart, said detachable section being adapted for transporting cleaning tools and supplies, whereby after the clean linen has been removed from said shelf the latter is moved to a storing position on said cart thereby permitting said cart to accommodate dirty linen for transport to the laundry.

3. A wheeled cart as claimed in claim 2 wherein said section can be detached prior to the transport of dirty linen to the laundry.

4. A wheeled cart as claimed in claim 2 wherein said shelf is stored on said cart in a vertical position abutting one of said end walls.

* * * * *